US012777554B2

(12) United States Patent
Cho et al.

(10) Patent No.: US 12,777,554 B2
(45) Date of Patent: Oct. 27, 2026

(54) SYSTEMS AND METHODS FOR DYNAMIC CONTROL OF CONNECTED-MODE DISCONTINUOUS RECEPTION

(71) Applicant: Verizon Patent and Licensing Inc., Basking Ridge, NJ (US)

(72) Inventors: Yong Sang Cho, Old Tappan, NJ (US); Chokri Trabelsi, Bridgewater, NJ (US); Jeremy Nacer, Boca Raton, FL (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 278 days.

(21) Appl. No.: 18/619,400

(22) Filed: Mar. 28, 2024

(65) Prior Publication Data

US 2025/0311048 A1 Oct. 2, 2025

(51) Int. Cl.

*H04W 76/28* (2018.01)
*H04L 43/0882* (2022.01)
*H04W 72/1273* (2023.01)

(52) U.S. Cl.

CPC ......... *H04W 76/28* (2018.02); *H04L 43/0882* (2013.01); *H04W 72/1273* (2013.01)

(58) Field of Classification Search

CPC .............. H04W 76/28; H04W 72/1273; H04L 43/0882

See application file for complete search history.

(56) References Cited

U.S. PATENT DOCUMENTS

2016/0014716 A1* 1/2016 Tabet .................. H04W 68/005 455/458
2023/0354192 A1* 11/2023 Abedini ............ H04W 52/0216

FOREIGN PATENT DOCUMENTS

WO WO-2013074015 A1 * 5/2013 ........ H04W 52/0216

* cited by examiner

*Primary Examiner* — Brenda H Pham

(57) ABSTRACT

A device may include a processor. The processor may be configured to receive parameters that are associated with a User Equipment device (UE); select, based on the parameters, a connected-mode discontinuous reception (CDRX) timing parameters; and determine a traffic load at the device. When the traffic load at the device is greater than a threshold, the processor may send the CDRX timing parameters to the UE.

20 Claims, 10 Drawing Sheets

700

100

300

700

SYSTEMS AND METHODS FOR DYNAMIC CONTROL OF CONNECTED-MODE DISCONTINUOUS RECEPTION

BACKGROUND INFORMATION

Deployment of advanced cellular networks poses optimization challenges for mobile network operators as more technologically advanced User Equipment devices (UE) make their way into the marketplace. UEs typically exhibit complex transmission and reception behavior that depends on the settings that can be changed via base stations in the Radio Access Networks (RANs). Identifying different UE settings that may be adjusted at the base stations to improve wireless communications with the UEs, however, can be difficult, as the base stations employ a wide range of technologies.

DETAILED DESCRIPTION

The following detailed description refers to the accompanying drawings. The same reference numbers in different drawings may identify the same or similar elements.

As used herein, the terms "service provider" and "provider network" may refer to, respectively, a provider of communication services and a network operated by the service provider. The network may be a cellular network. A cellular network may be uniquely identified by a Public Land Mobile Network (PLMN) Identifier (ID).

Figure 1:
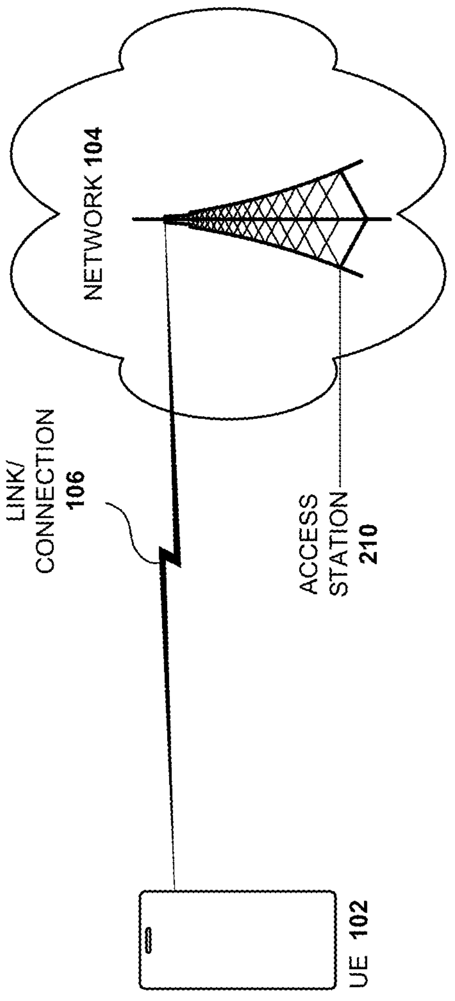
FIG. 1 illustrates concepts described herein.

The systems and methods discussed herein pertain to dynamic management of connected-mode discontinuous reception (CDRX). More specifically, the systems and methods address how to dynamically control long CDRX cycles at User Equipment (UE) devices connected to a provider network, to have the UEs adapt to various network traffic conditions. FIG. 1 illustrates the concepts elucidated. Following power-up, UE 102 (e.g., a smartphone, an Internet-of-Things (IoT) device, etc.) may detect broadcast signals from an access station 210 (e.g., a base station) within the radio access network (RAN) of provider network 104. Subsequently, UE 102 may acquire networking parameters from the broadcast signal, initiate a Radio Resource Control (RRC) connection 106 with access station 210, and register with provider network 104. Once the RRC connection is established, UE 102 can commence a session with provider network 104 to access various services (e.g., a video streaming service, an Internet, Voice-over-IP service, a data session service, etc.).

Following registration, depending on the activity level between UE 102 and provider network 104, UE 102 may remain in a connected state or transition to an idle state or an inactive state. In any of these states, to conserve battery power, UE 102 may adopt the discontinuous reception (DRX) mode as per DRX parameters specified by access station 210. During a connected-mode DRX (CDRX), UE 102 can minimize power consumption by periodically powering down its communication system during sleep intervals (e.g., shutting down its Radio Frequency (RF) circuitry) and restoring power during wake intervals.

While in a CDRX mode, the amount of power saved by UE 102 may depend on how well its sleep and wake intervals of the CDRX cycles synchronize with the signaling periods of access station 210. However, the timing of these intervals depends on static CDRX parameters, and any changes in the signaling periods of access station 210 can lead to increased desynchronization. In such cases, UE 102 can potentially enhance power savings by adjusting the timing of its sleep and wake intervals. The systems and methods outlined here offer dynamic control of long CDRX cycles at UE 102, enabling better synchronization with access station 210 signaling and thereby improving power efficiency.

Figure 2:
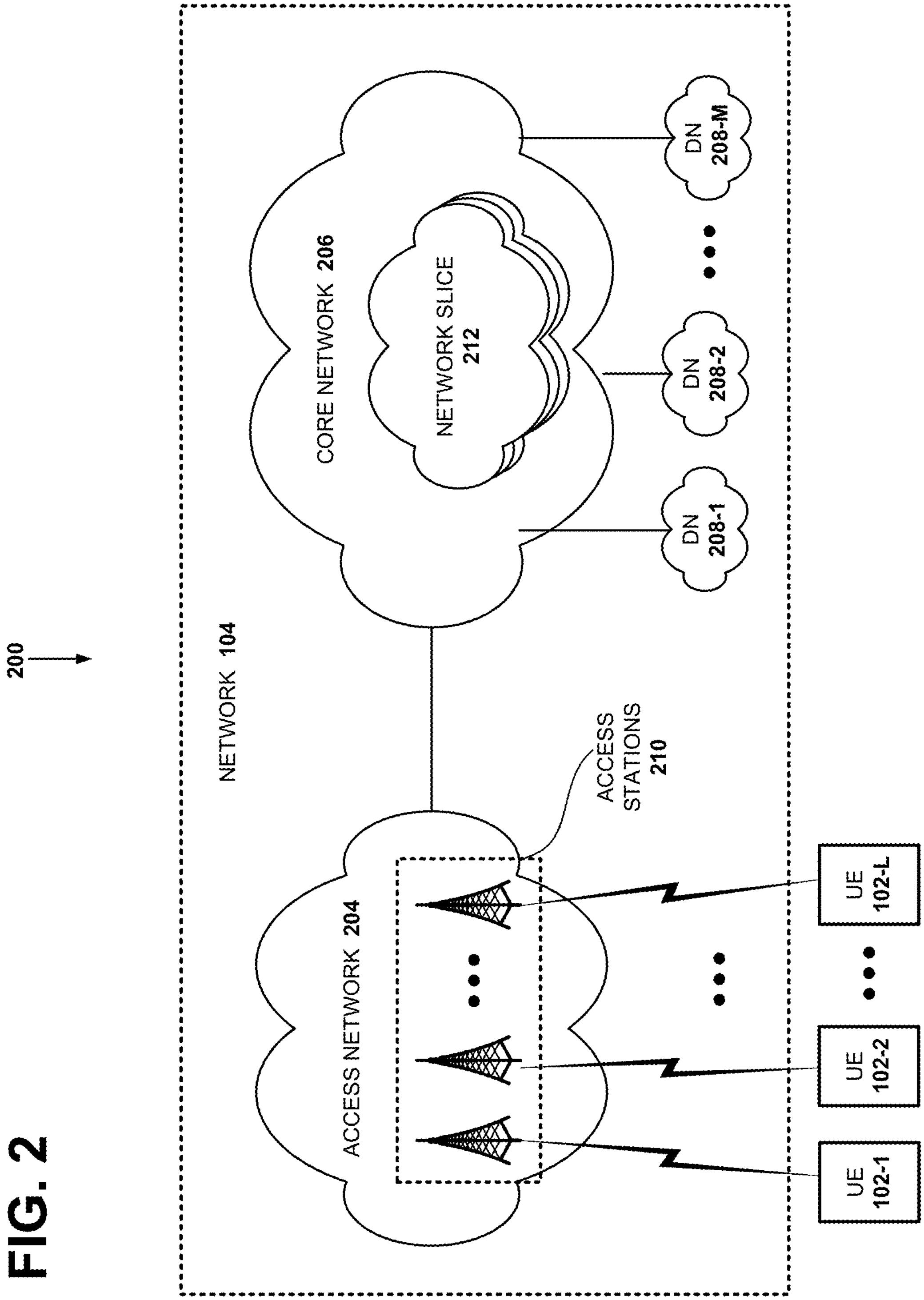
FIG. 2 illustrates an exemplary network environment in which systems and methods described herein may be implemented.

FIG. 2 illustrates an exemplary network environment 200 in which the systems and methods described herein may be implemented. As shown, network environment 200 may include UEs 102-1 through 102-L (collectively referred to as UEs 102 and generically referred to as UE 102), access network 204, core network 206, and data networks (DNS) 208-1 through 208-M (collectively referred to as data networks 208 and generically as data network 208). Access network 204, core network 206, and data networks 208 may be part of provider network 104.

UEs 102 may include a wireless communication device capable of Fourth Generation (4G) (e.g., Long-Term Evolution (LTE)) communication, Fifth Generation (5G) New Radio (NR) communication, and/or other wireless communication. Examples of UE 102 include: a Fixed Wireless Access (FWA) device; a Customer Premises Equipment (CPE) device with 4G and 5G capabilities; a smart phone; a tablet device; a wearable computer device (e.g., a smart watch); a global positioning system (GPS) device; a laptop computer; a media playing device; a portable gaming system; an autonomous vehicle navigation system; a sensor; and an Internet-of-Things (IoT) device. In some implementations, UE 102 may include a wireless Machine-Type-Communication (MTC) device that communicates with other devices over a machine-to-machine (M2M) interface, such as LTE-M or Category M1 (CAT-M1) devices and Narrow Band (NB)-IoT devices.

UEs 102 may be capable of adjusting its CDRX cycles based on CDRX profiles that UE 102 receives from access station 210 via RRC messages. A CDRX profile may specify CDRX timing parameters such as, for example, CDRX cycle time, CDRX-Start offset time, an On-Duration, an inactivity interval, and a sleep interval. By adjusting its CDRX cycle time, CDRX-Start offset time, On-Duration, and inactivity interval, UE 102 may change the timing of its CDRX cycles to better synchronize its CDRX cycles to signals from access station 210 and improve its power efficiency.

Access network 204 may facilitate UE 102's connection to core network 206 by establishing and managing over-the-air channels with UE 102 and backhaul channels with core network 206. These channels enable the relay of information between UE 102 and core network 206. Access network 204 comprises LTE, 5G NR, or other advanced radio access networks, featuring components such as central units (CUs), distributed units (DUs), radio units (RUs), and access stations 210. Access stations 210, which may include base stations with RF transceivers, may be capable of determining CDRX profiles for different bands occupied by UEs 102, radio access technologies (RATs) used by UEs 102, and/or network slices 212 to which UEs 102 are connected. As described below with reference to FIGS. 4-7, access station 210 may use the determined CDRX profiles to dynamically control long CDRX cycles at UEs 102 connected to provider network 104 to save its battery power.

Core network 206 may oversee communication sessions for subscribers connecting via access network 204. For instance, core network 206 may facilitate the establishment of Internet Protocol (IP) connections between UEs 102 and data networks 204. The components within core network 206 can be either dedicated hardware elements or virtualized functions operating atop a shared physical infrastructure using Software Defined Networking (SDN). An SDN controller, for example, may leverage an adapter to implement one or more core network components through virtualized entities like virtual network functions (VNF) virtual machines, Cloud Native Function (CNF) containers, event-driven serverless architecture interfaces, or other SDN components. This shared physical infrastructure may include devices 800, as described below with reference to FIG. 8, within a cloud computing center associated with core network 206. Moreover, core network 206 may encompass 5G core network components, 4G core network components, or other types of components. Further elaboration on some of these components is provided below with reference to FIG. 3.

As further shown, core network 206 may include one or more network slices 212. Depending on the embodiment, network slices 212 may be implemented within other networks, such as access network 204 and/or data network 208. Access network 204, core network 206, and data networks 208 may include multiple instances of network slices 212 (generically or individually referred to as network slice 212). Each network slice 212 may be instantiated as a result of "network slicing," which involves a form of virtual network architecture that enables multiple logical networks to be implemented on top of a shared physical network infrastructure using SDN and/or network function virtualization (NFV). Each logical network, referred to as a "network slice," may encompass an end-to-end virtual network with dedicated storage and/or computational resources that include access network components, clouds, transport, Central Processing Unit (CPU) cycles, memory, etc. Furthermore, each network slice 212 may be configured to meet a different set of requirements and may be associated with a particular Quality-of-Service (QOS) Class Identifier (QCI), a type of service, a 5G QoS Identifier (5QI), and/or a particular group of enterprise customers associated with communication devices. Network slices 212 may be capable of supporting enhanced Mobile Broadband (eMBB) traffic, Ultra Reliable Low Latency Communication (URLLC) traffic, Time Sensitive Network (TSN) traffic, Massive IoT (MIOT) traffic, Vehicle-to-Everything (V2X) traffic, High performance Machine Type Communication (HMTC) traffic, and other customized traffic, for example.

Each network slice 212 may be associated with an identifier, herein referred to as a Single Network Slice Selection Assistance Information (S-NSSAI) and/or a network slice instance ID. Each UE 102 that is configured to access a particular network slice 212 may be associated with corresponding data, stored in core network 206 for example, which includes the S-NSSAI that identifies the network slice 212.

Data networks 208 may include one or more networks connected to core network 206. In some implementations, a particular data network 208 may be associated with a data network name (DNN) in 5G and/or an Access Point Name (APN) in 4G. UE 102 may request a connection to data network 208 using a DNN or APN. Each data network 208 may include, and/or be connected to and enable communications with, a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Data network 208 may include an application server (also referred to as application). An application may render services to other applications running on UEs 102 and may establish communication sessions with UEs 102 via core network 206.

For clarity, FIG. 2 does not show all components that may be included in network environment 200 (e.g., routers, bridges, wireless access points, additional networks, additional access stations 210, data centers, portals, etc.). Depending on the implementation, network environment 200 may include additional, fewer, different, or a different arrangement of components than those illustrated in FIG. 2.

Figure 3:
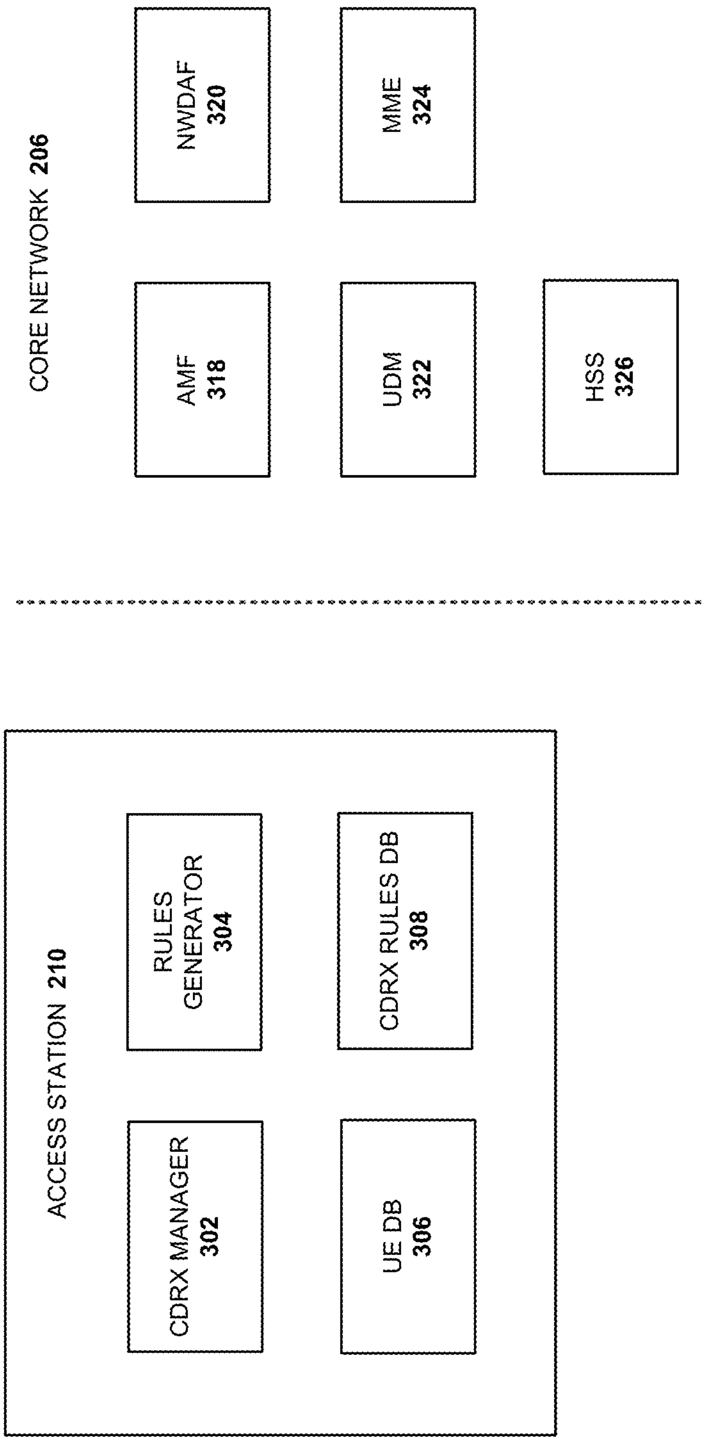
FIG. 3 depicts example functional components of a system for dynamic control of connected-mode discontinuous reception (CDRX), according to an implementation.

FIG. 3 depicts example functional components of a system 300 for dynamically controlling long CDRX cycles at UEs 102, according to an implementation. As shown, system 300 may include access station 210 and components of core network 206. Access station 210 may include CDRX manager 302, a rules generator 304, a UE database (DB) 306, and a CDRX rules DB 308. Other components of access station 210 are not shown in FIG. 3. Depending on the implementation, access station 210 may include additional, fewer, different, or a different arrangement of components of system 300 than those illustrated in FIG. 3.

Figure 4A:
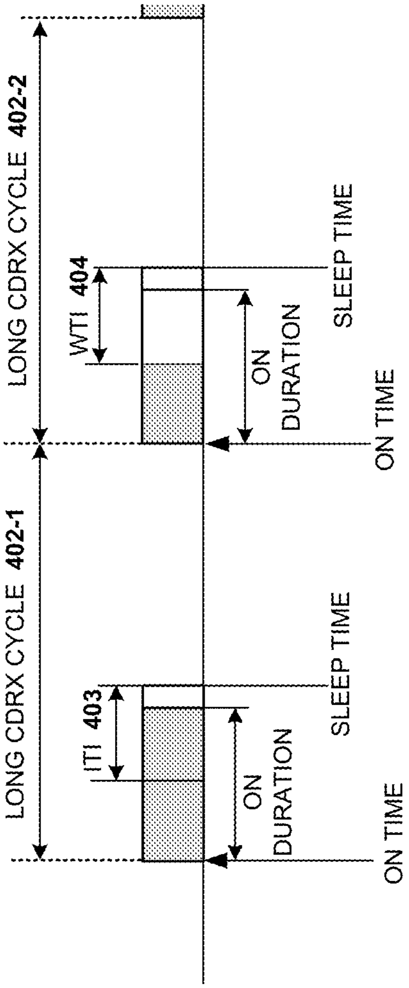
FIG. 4A is a timing diagram of example long CDRX cycles during a low or normal network load, according to an implementation.

CDRX manager 302 may dynamically control the timing of CDRX cycles at UEs 102, depending on operating conditions at access station 210. For example, When traffic at access network 206 is at a relatively low or normal level, CDRX cycles at UE 102 may be well synchronized to signals from access station 210 and, in such situations, CDRX manager 302 may not attempt to modify the timing of CDRX cycles at UE 102. FIG. 4A is a timing diagram of example long CDRX cycles 402-1 and 402-2 of UE 102 during a low or normal network load. As shown in cycle 402-1, UE 102 may be "awake" (e.g., UE 102 directs full power to its communication system) during an On-Duration and powers down starting at the sleep time. During On-Duration, UE 102 may detect and receive a Physical Downlink Control Channel (PDCCH) signal broadcast by access station 210. Thereafter, UE 102 may begin an inactivity time interval (ITI) 403 during which UE 102 may further attempt to detect and decode the PDCCH signal. ITI 403 may last beyond On-Duration. During ITI 403 and perhaps an interval of time after decoding a PDCCH and the start of ITI 403, UE 102 has to remain active, and therefore waste power without receiving any information from access station 210. This is depicted in a CDRX cycle 402-2, which is shown as including a wasted time interval (WTI 404)

When traffic at access station 210 is at a low or normal level, PDCCH signals may be well synchronized to On-Duration and therefore, the wasted time interval may be maintained at low values. The network may provide a DRX-Start offset time to UE to align the timing of PDCCH signals with the start time of on-Duration start time of the UE 102. The wasted battery power (e.g., battery power consumed during the wasted time interval) may be minimal and accordingly, CDRX manager 302 may not attempt to modify the timing of CDRX cycles at UEs 102.

Figure 4B:
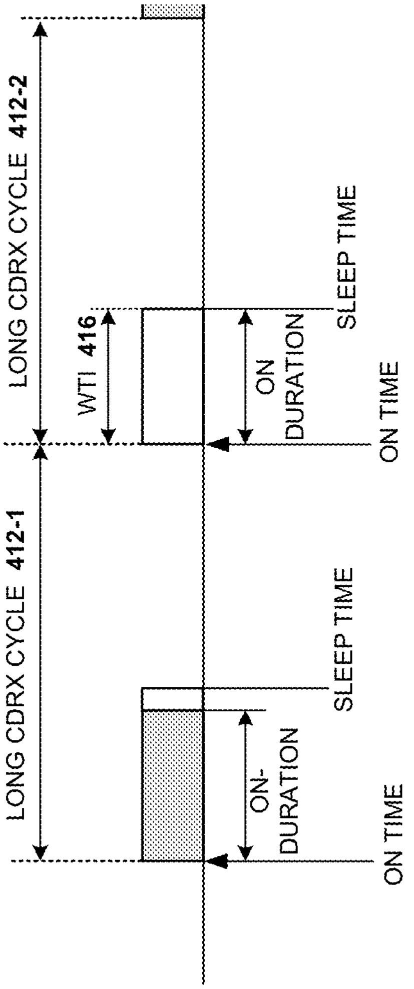
FIGS. 4B and 4C are timing diagrams of example long CDRX cycles during a heavy network load without dynamic control of CDRX, according to an implementation.

When network operating conditions are no longer normal (e.g., access network 204 has a heavy load), CDRX manager 302 may attempt to send RRC messages to UEs 102 to have UEs 102 change the timing of their CDRX cycles. FIG. 4B is an example timing diagram of long CDRX cycles during a heavy network load, without CDRX manager 302 dynamically controlling the timing of CDRX cycles at UE 102. In FIG. 4B, UE 102 may receive a PDCCH signal from access station during a long CDRX cycle 412-1. However, due to heavy traffic, access station 210 may be unable to schedule and transmit another PDCCH signal within CDRX cycle 412-2 of UE 102. Accordingly, the entirety of On-Duration within CDRX cycle 412-2 may be included in a wasted time interval 416. If UE 102 were asleep during wasted time interval 416, UE 102 would not have missed any information from access station 210—since access does not transmit a PDCCH signal during the time interval. In response to use-case scenarios similar to the one depicted in FIG. 4B, CDRX manager 302 may cause UE 102 to be asleep during the time interval occupied by CDRX cycle 412-2 and hence enable UE 102 to save battery power.

Figure 4C:
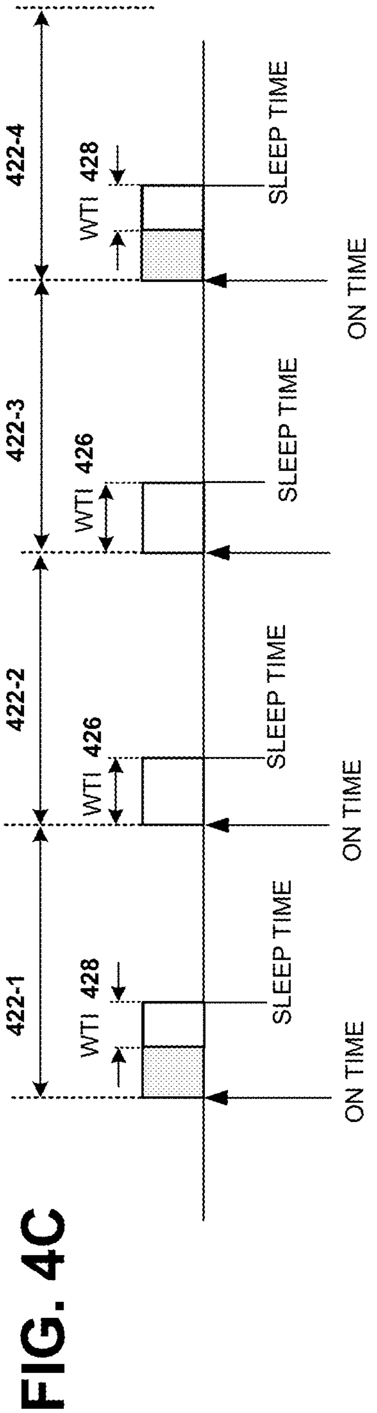

FIG. 4C is another example timing diagram of long CDRX cycles during a heavy network load, without CDRX manager 302 dynamically controlling CDRX cycles at UE 102. In FIG. 4C, UE 102 may receive PDCCH signals from access station 210 during long CDRX cycles 422-1 and 422-4. However, due to heavy traffic, access station 210 may be unable to schedule and transmit PDCCH signals during CDRX cycles 422-2, 422-3, etc. Accordingly, the entirety of On-Duration intervals within CDRX cycles 422-2 and 422-3 include wasted time intervals 426. In addition, the On-Duration intervals within CDRX cycles 422-1 and 422-4 include wasted time intervals 428. Wasted time intervals 428 may be larger than wasted time interval 404 in FIG. 4A due to greater desynchronization depicted in FIG. 4C. In response to use-case scenarios similar to the one depicted in FIG. 4C, CDRX manager 302 may cause UE 102 to change the timing of its CDRX cycles to reduce wasted power.

Figure 4D:
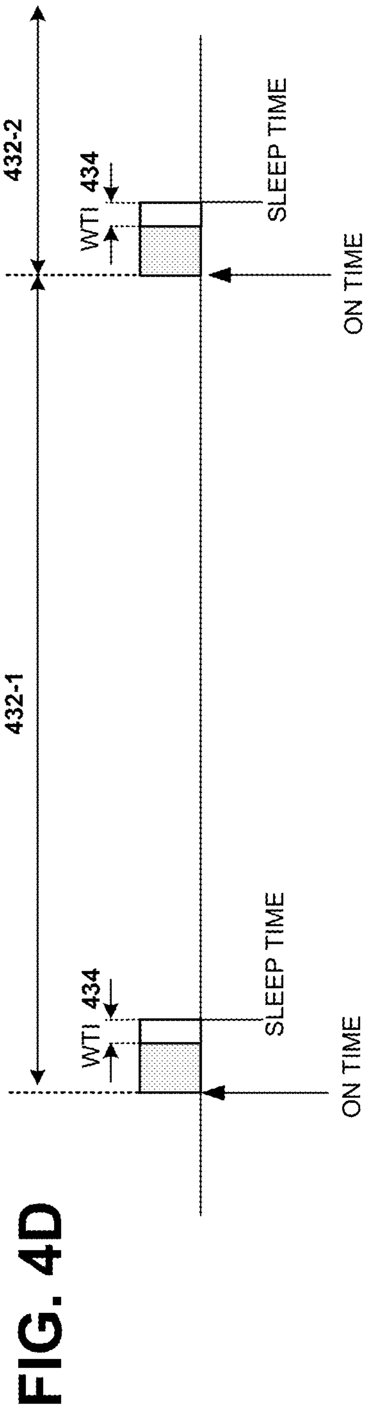
FIG. 4D is a timing diagram of example long CDRX cycles during a heavy network load with dynamic control of CDRX, according to an implementation.

FIG. 4D is a timing diagram of example long CDRX cycles during a heavy network load, with CDRX manager 302 dynamically controlling CDRX cycles at UE 102. More specifically, the timing diagram shows a result of CDRX manager 302 causing UE 102 to adjust CDRX cycles shown in FIG. 4C. As a result of the adjustment, UE 102 increases the duration of CDRX cycles 422, leading to CDRX cycles 432. By sleeping during most of CDRX cycles 432 when access station 302 does not transmit PDCCH signals, UE 102 may avoid wasted time intervals 426. In addition, in CDRX cycles 432. Wasted time intervals 434 may be shorter than wasted time intervals 428 of FIG. 4C (e.g., waster time intervals 432 may include a shorter inactivity time intervals).

Referring back to FIG. 3, CDRX manager 302 may perform at least part of a process that is associated with dynamic control of CDRX cycles at UEs 102. The process may include obtaining traffic-related data from components of access station 210 and/or from components in core network 206. The traffic-related data may include, for example, a cell latency value, a Physical Resource Block (PRB) utilization rate, a Transmission Time Interval (TTI) utilization rate, a User Perceived Throughput (UPTP), a number of RRC connections to UEs 102 in the cell, a cell throughput. CDRX manager 302 may determine a network load based on the obtained traffic-related data.

After CDRX manager 302 determines the network load, for each UE 102 attached to access station 210, CDRX manager 302 may retrieve CDRX rules from CDRX rules database 308. Each CDRX rule 308 may specify various conditions (e.g., a UE group ID, a QI associated with UE 102, a RAT of UE 102, etc.) and a load threshold for applying a CDRX profile-a set of CDRX timing parameters. If various characteristics of UE 102 meet the conditions specified in the rule and the network load is above the load threshold, CDRX manager 302 may apply the CDRX profile to UE 102, to cause UE 102 to synchronize its CDRX timing parameters to signaling patterns of access station 210.

Rules generator 304 may collect UE parameter values (e.g., UE-related information) from components of core network 206 and/or UEs 102 and store the values in UE DB 306. Examples of the UE parameter values include QoS identifiers (QIs) (e.g., 5QI or QCI) for each UE 102; IDs of network slices 212 to which the UEs 102 are subscribed; UE group IDs; bands used by UEs 102; and a long CDRX parameters of UEs 102 (e.g., a CDRX cycle duration, CDRX-Start offset time, an On-Duration, and an inactivity time interval); the RAT of UE 102; a UE category (e.g., one of network operator-defined categories or 3GPP defined categories); signal parameters such as a Reference Signal Received Power (RSRP), a Signal-to-Interference and Noise-Ratio (SINR), and channel quality information (CQI); device parameters such as a make and model of UE 102, the processor type for UE 102, the amount of memory of UE 102, the operating system of UE 102, and applications installed and running on UE 102. In addition, rules generator 304 may obtain and store, for each UE 102, timing parameters that are associated with the signals transmitted by access station 210 and received at UE 102. Rules generator 304 may receive the timing parameters of the signals from access station 210.

Rules generator 304 may generate CDRX rules and store the CDRX rules in CDRX rules DB 308. Each rule may specify a CDRX profile and conditions that need to be met by UE 102 for applying the CDRX profile to the UE 102. The conditions may comprise, for example, particular values of UE parameters (e.g., a particular UE group ID, a 5QI associated with UE 102, a particular RAT of UE 102, a network slice ID, etc.). When CDRX manager 302 determines that UE parameter values of a UE 102 (stored in UE CDRX DB 306) match the conditions in a rule (e.g., UE parameter values specified in the rule) and that traffic load of access station 210 exceeds the load threshold specified in the rule, CDRX manager 302 may apply the CDRX profile in the rule to the UE 102. UE DB 306 and CDRX rules DB 308 are described in greater detail with reference to FIGS. 5, 6A and 6B.

As further illustrated in FIG. 3, core network 206 may include 5G core network components, such as Access and Mobility Management Function (AMF) 318, a Network Data Analytics Function (NWDAF) 320, and a Unified Data Management (UDM) 322, and/or 4G core network components, such as a Mobility Management Entity (MME) 324 and a Home Subscriber Server (HSS) 326. Depending on the implementation, system 300 may include additional, fewer, or different components than those illustrated in FIG. 3. For example, in one embodiment, system 300 may include other 5G core network components, such as a Session Management Function (SMF), a Network Exposure Function (NEF), etc.

AMF 318 may perform registration management, connection management, reachability management, mobility management, lawful intercepts, Short Message Service (SMS) transport between UE 102 and a Short Message Service Function (SMSF), session management messages transport between UE 102 and a Session Management Function (SMF), access authentication and authorization, location services management, functionality to support non-3GPP access networks, and/or other types of management processes. AMF 318 may provide network traffic information pertaining to UEs 102 or network slices 212 to other network components, such as access station 210.

NWDAF 320 may collect analytics information associated with access network 204 and/or core network 206. For example, NWDAF 320 may obtain telemetry information relating to access network 204 from access stations 210 and provide collected telemetry information relating to UEs 102 to other network functions (NFs) and components. In another example, NWDAF 320 may obtain analytics information (e.g., predictive analytics data) for network slices 212 and provide them to a requesting network component. NWDAF 320 may also obtain Key Performance Indicators (KPIs) (e.g., UE throughput, cell throughput, etc.) and provide them to other NFs and network components.

UDM 322 may maintain subscription information for UEs 102, manage subscriptions, generate authentication credentials, handle user identification, perform access authorization based on subscription data, perform network function registration management, maintain service and/or session continuity by maintaining assignment of an SMF for ongoing sessions, support SMS delivery, support lawful intercept functionality, and/or perform other processes associated with managing user data. UDM 322 may store the data that it manages in a Unified Data Repository (UDR). UDM 322 may provide 5QIs/QCIs associated with UE 102, network slice IDs associated with UE 102, a price plan of the subscribed service, and/or other information to other network components.

MME 324 may implement 4G control plane processing for core network 206. For example, MME 324 may manage the mobility of UE 102, implement tracking and paging procedures for UE 102, activate and deactivate bearers for UE 102, authenticate a user of UE 102, and/or interface to non-LTE radio access networks. A bearer may represent a logical channel with particular QoS requirements. MME 324 may also select a particular serving gateway (SGW) for a particular UE 102. MME 324 may play a similar role for 4G core network components as AMF 318 does for 5G core network components and may provide traffic-related information to other network components, such as access station 210.

HSS 326 may store subscription information associated with UEs 102 and/or information associated with users of UEs 102. For example, HSS 326 may store subscription profiles that include authentication, access, and/or authorization information. Each subscription profile may include information identifying UEs 102, authentication and/or authorization information for UEs 102, services enabled and/or authorized for UEs 102, device group membership information for UEs 102, and/or other types of information associated with UEs 102. HSS 326 may include user information and/or UE information that is consistent with the information stored at a UDR and/or managed by UDM 322.

Figure 5:
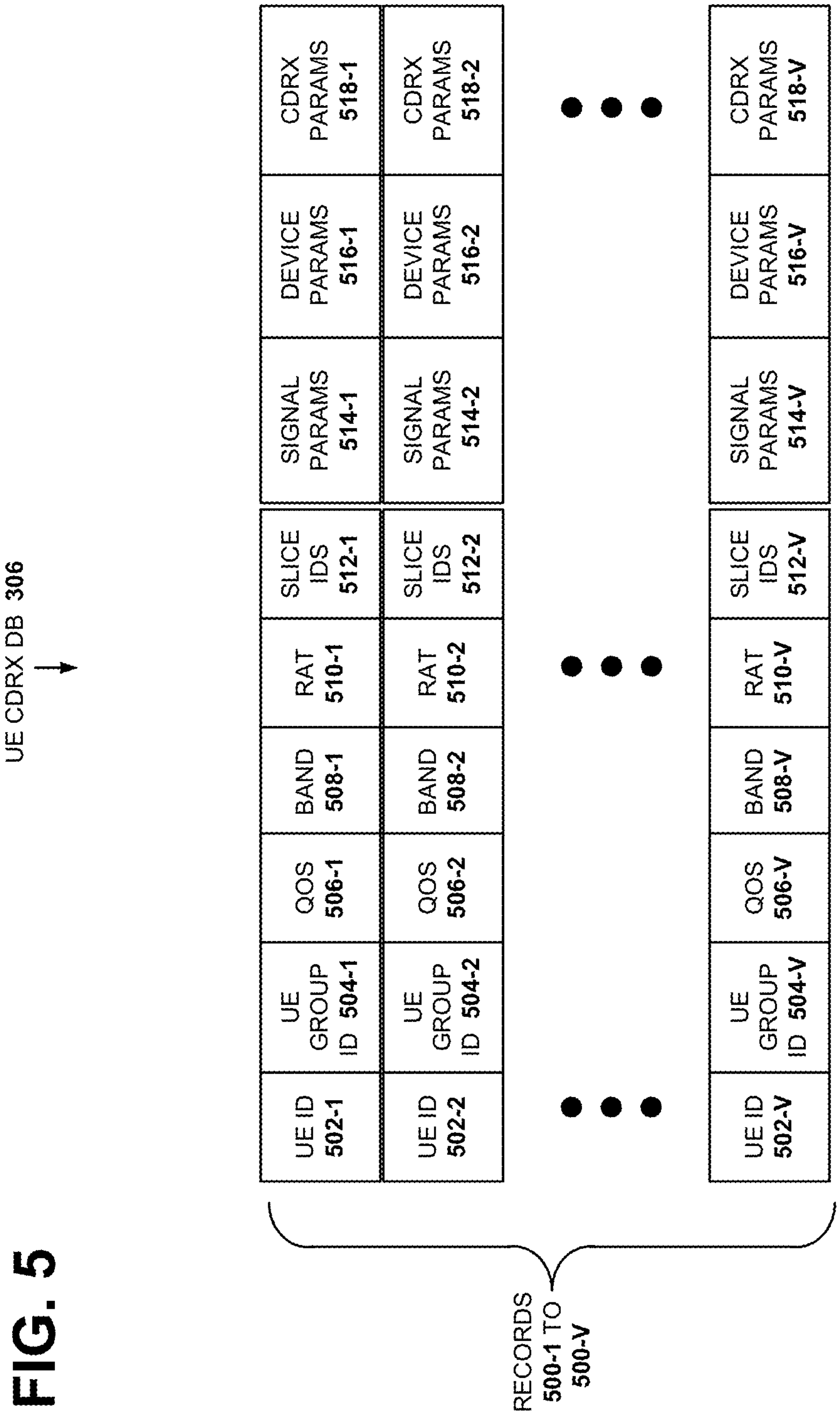
FIG. 5 shows example contents of an example User Equipment device (UE) DB, according to an implementation.

FIG. 5 shows example contents of UE DB 306. As explained above, rules generator 304 may collect parameter values of UEs 102 attached to access station 210, from UEs 102 and/or network components (e.g., AMF 318, NWDAF 320, UDM 322, MME 324, and HSS 326) and store the parameter values in UE DB 306. As shown, UE DB 306 may include records 500-1 through 500-V. Each record 500 may include UE ID field 502, a UE group ID field 504, a QoS field 506, a band field 508, a RAT field 510, slice IDs field 512, a signal parameters field 514, a device parameters field 516, and a CDRX parameters field 518.

UE ID field 502 may store an ID which may be me used to identify a UE 102 among attached UEs 102. The ID may include, for example, a Mobile Station International Subscriber Directory Number (MSISDN), an International Mobile Equipment Identity (IMEI), an International Mobile Subscriber Identity (IMSI), etc. UE group ID 504 may store a group ID assigned to UE 102 by network 104. QoS field 506 may store information indicating the QoS that is associated with the user data to/from UE 102. Band field 508 may store information identifying a frequency band or bands that UE 102 uses for communicating with access station 210. RAT field 510 may indicate the radio access technology that UE 102 uses to communicate with access station 210. Slice IDs field 512 may include IDs of network slices to which UE 102 is connected. The IDs may include, for example, NSSAI, S-NSSAIs, a network slice instance ID, or another type of network slice IDs.

Signal parameters field 514 may store information such as a Reference Signal Received Power (RSRP), a Signal-to-Interference and Noise-Ratio (SINR), and channel quality information (CQI). In addition, signal parameters field 514 may store timing parameters of broadcast signals (e.g., PDCCH signals) received at UE 102, such as a duration or the period of the signal.

Device parameter field 516 may store information such as a UE category (e.g., one of network operator-defined categories or 3GPP defined categories); a make and model of UE 102; the processor type for UE 102; the amount of memory of UE 102' the operating system of UE 102; and applications installed and running on UE 102. CDRX parameters field 518 may store the current CDRX parameters of UE 102. The parameters may include: a duration of a CDRX cycle, an On-Duration, and an inactivity time interval).

Figure 6A:
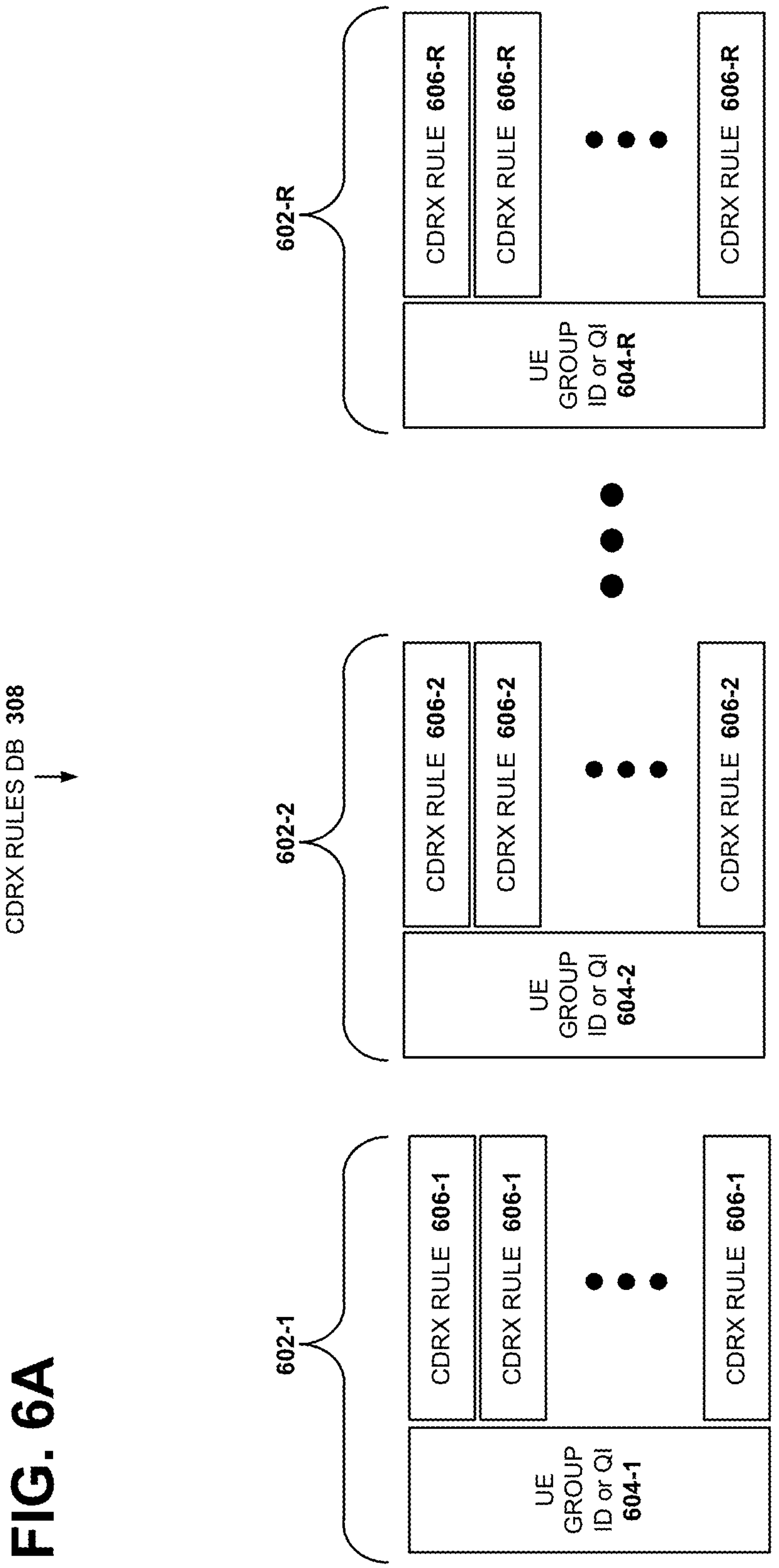
FIGS. 6A and 6B depict example contents of an example CDRX rules DB, according to an implementation.
Figure 6B:
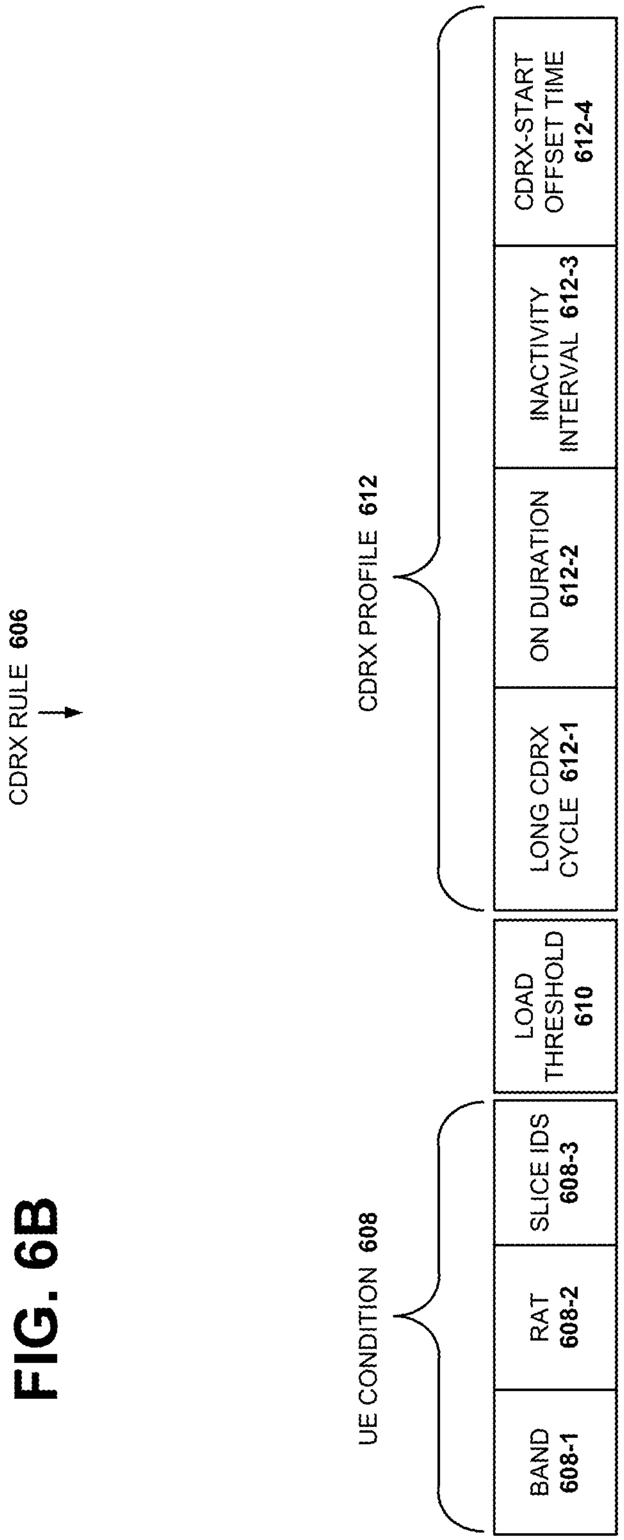

FIGS. 6A and 6B depict example contents of CDRX rules DB 308, according to an implementation. As described above, rules generator 304 may generate CDRX rules and store them in CDRX rules DB 308. As shown, CDRX rules DB 308 may include records 602-1 through 602-R. Each record 602 may include a UE group ID/QI field 604 and CDRX rules 606. Depending on the implementation, CDRX rule DB 604 may include additional or different components than those illustrated in FIG. 6A.

UE group ID/QI field 604 may specify the UE group ID and/or QOS ID (e.g., 5QI, QCI, etc.) for which CDRX rules may be applicable. For example, assume that CDRX manager 302 is identifying which CDRX rules in CDRX rules DB 308 may apply to a UE 102 and that the UE 102 is associated with 5QI of 4. CDRX manager 302 may select a record 602 whose UE group ID/QI field 604 includes the value matching that of the UE 102 (e.g., 4). CDRX rules 606 may include a set of rules from which a particular CDRX rule 606-X may be selected based parameters of the UE 102.

FIG. 6B shows example components of CDRX rule 606. As shown, each CDRX rule may include UE condition fields 608, load threshold field 610, and a CDRX profile 612. When one or more parameters of UE 102 match the values specified in UE condition fields 608 and the load at access station 210 exceeds load threshold field 610, CDRX manager 302 may apply CDRX profile 612 to UE 102, to dynamically change the timing of CDRX cycles at UE 102. Depending on the implementation, CDRX rule 606 may include additional or different components than those illustrated in FIG. 6B.

As shown, UE condition fields 608 may include a band field 608-1, a RAT field 608-2, and a slice IDs field 608-3. Band field 608-1, RAT field 608-2, and slice IDs field 608-3 may specify, respectively, a frequency band of UE 102, a RAT of UE 102, and one or more IDs of network slices 212 to which UE 102 may be collected. Thus, assuming that the load at access station 210 exceeds a threshold indicated in load threshold field 610, if a UE 102 uses the band, the RAT, and network slice specified in band field 608-1, RAT field 608-2, and slice ID field 608-3, CDRX manager 302 may apply CDRX profile 612 to UE 102.

Load threshold field 610 may store a threshold that the load at access station 210 must exceed for CDRX manager 302 to apply CDRX profile 612 to UE 102 whose parameters match those specified in UE condition fields 608. CDRX profile 612 may specify timing parameters that CDRX manager 302 may send to UE 102 to modify its CDRX timing parameters. As shown, CDRX profile 612 may include a long CDRX cycle field 612-1, an On-Duration field 612-2, an inactivity interval field 612-3, and CDRX-Start offset time 612-4. Long CDRX cycle field 612-1, On-Duration field 612-2, and inactivity interval field 612-3 may store a target long CDRX cycle time or period, a target On-Duration, a target inactivity interval, and an offset time for UE 102 to align the arrivals of PDCCH signals to the start of On-Duration of its CDRX cycles.

In CDRX rules DB 308, CDRX profile 612 that has the smallest On-Duration and inactivity interval and the largest long CDRX cycle time may be associated with (or mapped to) a largest load threshold indicated in load threshold field 610 (e.g., indicating heaviest traffic at access station 210 or the cell). Generally, CDRX profiles 612 with smaller an On-Duration and a smaller inactivity interval are associated with higher load threshold values.

Conversely, CDRX profile 612 that has the largest On-Duration and inactivity interval and the smallest long CDRX cycle time is associated with lowest load threshold (in load threshold field 610 (e.g., indicating lowest traffic at access station 210 or the cell). Generally, CDRX profiles 612 with a larger On-Duration and a larger inactivity interval are associated with lower load threshold values.

In addition, in CDRX rules DB 308, an On-Duration of CDRX profile 612 (for a set of UEs 102 that share the same UE parameter values specified by condition fields 608 and UE group ID/QI specified by field 604) may be greater than the durations of the signals (e.g., durations of PDCCH signals) from access station 210 (e.g., a time interval spanned by each of the signals) to the UEs 102. In addition, long CDRX cycle field 612-1 of CDRX profile 612 may include an average of the periods of the signals from access station 210 to UEs 102 (e.g., a time between two consecutive signals from access station 210).

According to an implementation, in CDRX rules DB 308, a unique CDRX profile may be associated with or mapped to each band, each RAT, and each network slice; or alternatively, a unique CDRX profile 612 may be associated with or mapped to a unique combination of a band, a RAT, and a network slice 212. In such an implementation, different CDRX profiles may exist for the same UE 102 for a unique combination of a band, a RAT, and a network slice used by UE 102, depending on the network load.

Figure 7:
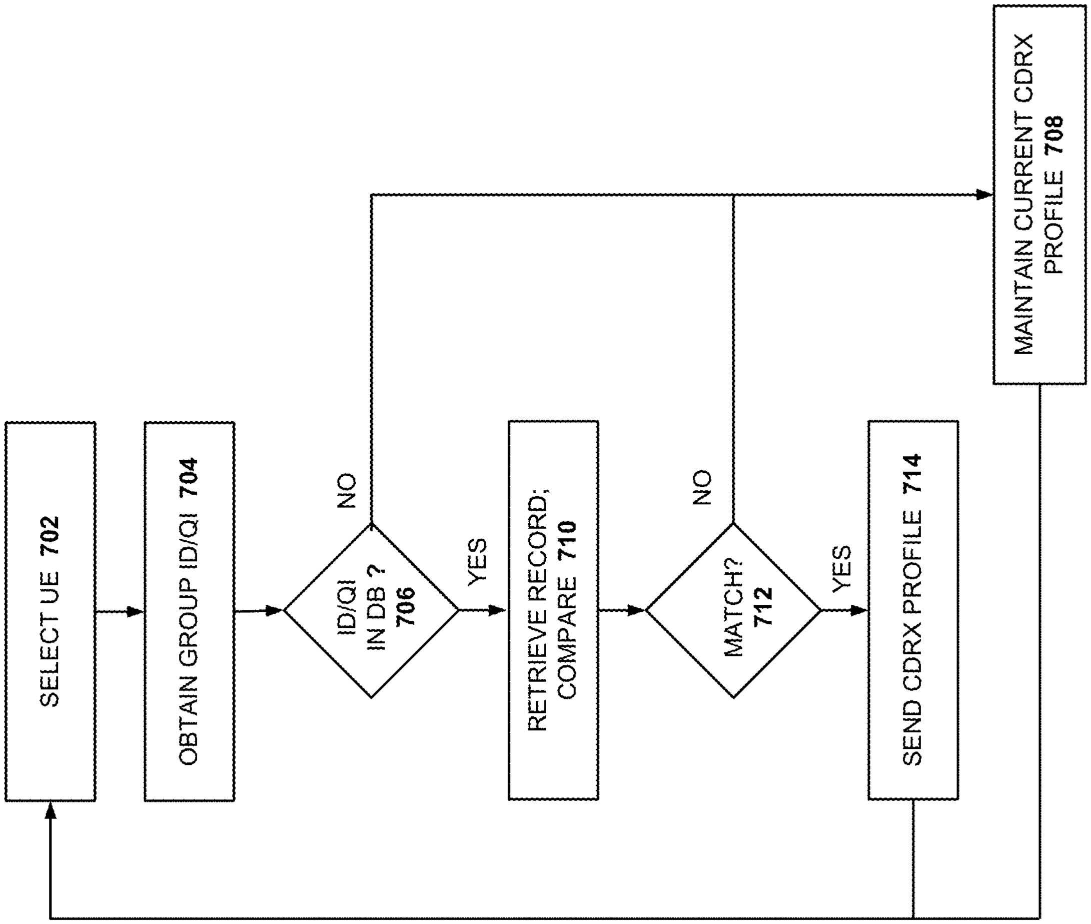
FIG. 7 shows a flow diagram of an example process that is associated with dynamic control of CDRX.

FIG. 7 shows a flow diagram of an example process 700 that is associated with a dynamic control of CDRX. Process 700 may be performed by one or more components of system 300. As shown, process 700 may include CDRX manager 302 selecting UE 102 (among UEs 102 that are attached to access station 210) for dynamic control of its CDRX timing parameters (block 702). In addition, CDRX manager 302 may obtain a UE group ID of the selected UE 102 or a QI (e.g., 5QI or QCI) associated with the selected UE 102 (block 704).

Process 700 may further include CDRX manager 302 determining whether the UE group ID or the QI of the UE 102 is included in one of UE group ID/QI fields 604 of records 600 in CDRX rules DB 308 (block 706). If CDRX manager 302 determines that the UE group ID or the QI of the UE 102 is not in CDRX rules DB (block 706: NO), CDRX manager 302 may proceed to block 708. At block 708, CDRX manager 302 decides to maintain the current timing of CDRX cycles at UE 102. Process 700 may then return to block 702.

Referring back to block 706, if CDRX manager 302 finds the UE group ID/QI of the UE 102 in CDRX rules DB 308 (block 706: YES), CDRX manager 302 may retrieve the record 602 whose UE group ID/QI in the corresponding UE group ID/QI field 604 matches that of the UE 102 (block 710). Next, CDRX manager 302 may compare or match parameters of the UE 102 (e.g., a frequency band, a RAT, and/or a network slice ID) to parameters that are specified in the UE condition fields 608 pf CDRX rules 606 (block 710). In addition, CDRX manager 302 may compare the current load of the cell to the value stored in load threshold field 610 of CDRX rules 606 (block 710).

At block 712, CDRX manager 302 may identify a CDRX rule 606 that includes UE condition fields 608 whose values match parameters of the UE 102; and determine whether the load is greater than the load threshold (block 712). If there is no match and/or the load is not greater than the threshold (block 712: NO), process 700 may proceed to block 708. Otherwise (block 712: YES), process 700 may proceed to block 714. At block 714, CDRX manager 302 may send the timing parameters of the CDRX profile 612 of the CDRX rule 606 whose conditions were satisfied by UE 102. When UE 102 receives the CDRX profile from access station 210, UE 102 may modify its CDRX cycle time, On-Duration, and inactivity time interval to synchronize its CDRX cycle to the signals from access station 210. By improving the synchronization, UE 102 may save more battery power, thereby increasing its power efficiency. Process 700 may then return to block 702.

Figure 8:
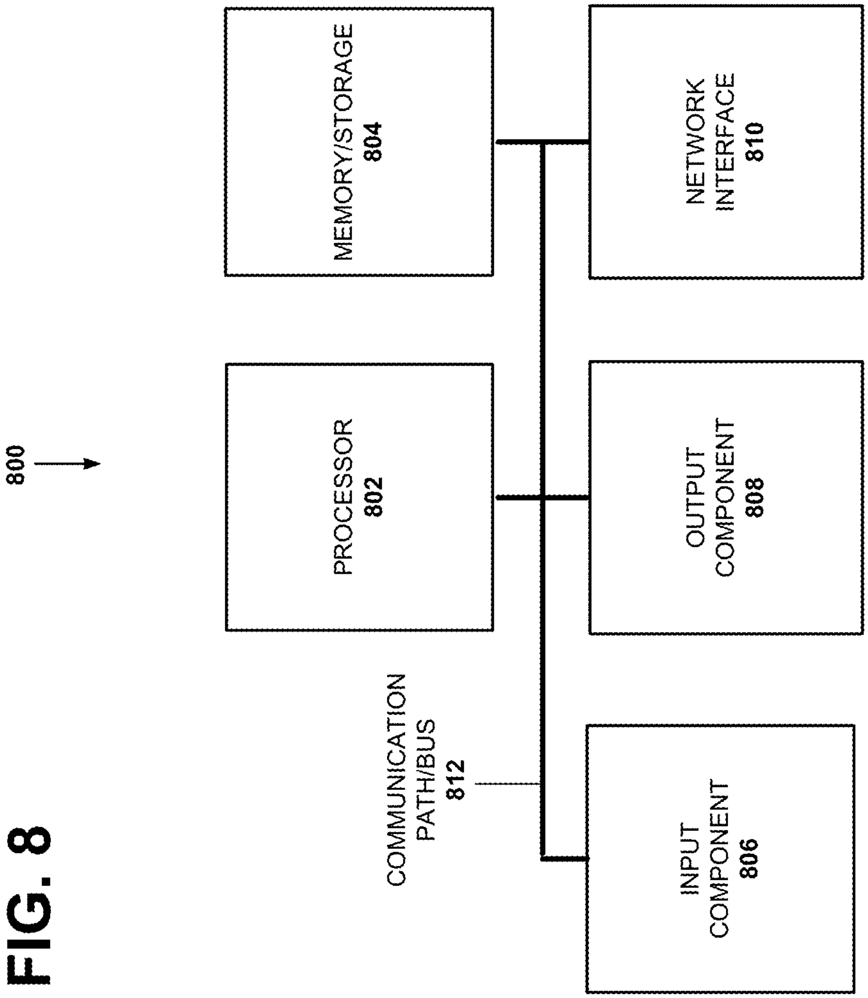
FIG. 8 depicts exemplary functional components of a network device according to an implementation.

FIG. 8 depicts exemplary components of a network device 800. Network device 800 may correspond to or be included in any of the devices and/or components illustrated in FIGS. 1-6 (e.g., UE 102, provider network 104, access network 204, core network 206, data network 208, access station 210 and its components 302-308, core network components 318-326, etc.). In some implementations, network devices 800 may be part of a hardware network layer on top of which other network layers and NFs may be implemented. As shown, network device 800 may include a processor 802, memory/storage 804, input component 806, output component 808, network interface 810, and communication path 812. In different implementations, network device 800 may include additional, fewer, different, or different arrangement of components than the ones illustrated in FIG. 8. For example, network device 800 may include line cards, switch fabrics, modems, etc.

Processor 802 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 800 and/or executing programs/instructions.

Memory/storage 804 may include static memory, such as read only memory (ROM), and/or dynamic memory, such as random access memory (RAM), or onboard cache, for storing data and machine-readable instructions (e.g., programs, scripts, etc.). Memory/storage 804 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 804 may be external to and/or removable from network device 800. Memory/storage 804 may include, for example, a Universal Serial Bus (USB) memory stick, a dongle, a hard disk, off-line storage, a Blu-Ray® disk (BD), etc. Memory/storage 804 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 806 and output component 808 may provide input and output from/to a user to/from network device 800. Input/output components 806 and 808 may include a display screen, a keyboard, a mouse, a speaker, a microphone, a camera, a DVD reader, USB lines, and/or other types of components for obtaining, from physical events or phenomena, to and/or from signals that pertain to network device 800.

Network interface 810 may include a transceiver (e.g., a transmitter and a receiver) for network device 810 to communicate with other devices and/or systems. For example, via network interface 810, network device 800 may communicate over a network, such as the Internet, an intranet, cellular, a terrestrial wireless network (e.g., a WLAN, WIFI, WIMAX, etc.), a satellite-based network, optical network, etc. Network interface 810 may include a modem, an Ethernet interface to a LAN, and/or an interface/connection for connecting network device 800 to other devices (e.g., a Bluetooth interface). Communication path or bus 812 may provide an interface through which components of network device 800 can communicate with one another.

Network device 800 may perform the operations described herein in response to processor 802 executing software instructions stored in a non-transient computer-readable medium, such as memory/storage 804. The software instructions may be read into memory/storage 804 from another computer-readable medium or from another device via network interface 810. The software instructions stored in memory/storage 804, when executed by processor 802, may cause processor 802 to perform one or more of the processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while series of actions have been described with reference to FIG. 6. the order of the actions may be modified in other implementations. In addition, non-dependent actions may be performed in parallel and in different orders. Furthermore, each of the actions may include one or more constituent actions.

In the above, the term "RRC" may refer to a signaling protocol used between UE 102 and a RAN part of access network 204. Via RRC, UE 102 and the RAN may manage the radio resources, including establishment, reconfiguration, and release of radio bearers. In contrast, the term "Protocol Data Unit (PDU) session" or "Packet Data Network (PDN) session" may refer to a logical connection for handling the transfer of data between UE 102 and core network 206. Whereas RRC is part of the control plane in the RAN, a PDU session or a PDN session may be part of the user plane in core network 206.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code-it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items.

Further, the phrase "based on" is intended to mean "based, at least in part, on" unless explicitly stated otherwise.

What is claimed is:

1. A device comprising:
a processor configured to:
receive parameters that are associated with a User Equipment device (UE);
select, based on the parameters, a connected-mode discontinuous reception (CDRX) timing parameters that include an On-Duration and a long CDRX cycle period;
determine a traffic load at the device; and
when the traffic load at the device is greater than a threshold, send the CDRX timing parameters to the UE,
wherein the On-Duration is longer than a duration of signals from the device to UEs that are to share the CDRX timing parameters; and
wherein the long CDRX cycle period is equal to an average of periods of the signals from the device to the UEs that are to share the CDRX timing parameters.

2. The device of claim 1, therein the parameters comprise at least one of:
a UE group identifier (ID);
a Quality-of-Service (QOS) ID;
a radio access technology (RAT) type;
a frequency band; or
an ID of a network slice to which the UE is connected.

3. The device of claim 1, wherein when the processor determines the traffic load, the processor is configured to determine the traffic load based on one or more of:
a physical resource block (PRB) utilization rate;
a transmission time interval (TTI) utilization rate;
a cell throughput; or
a user perceived throughput (UPTP).

4. The device of claim 1, wherein the CDRX timing parameters further include at least one of:
an inactivity time interval; or
a CDRX-Start offset time.

5. The device of claim 4, wherein:
the On-Duration that is less than an On-Duration of a current CDRX cycle of the UE;
the inactivity time interval is less than an inactivity interval of the current CDRX cycle of the UE; and
the long CDRX cycle period is greater than a long cycle CDRX cycle period of the current CDRX cycle of the UE.

6. The device of claim 1, wherein the processor is further configured to:
transmit physical downlink control channel (PDCCH) signals to the UE, and
wherein the CDRX timing parameters specify timing, at the UE, of CDRX cycles synchronized to the PDCCH signals.

7. The device of claim 6, wherein the processor is further configured to:
determining the CDRX timing parameters based on timing of broadcast signals to UEs that are wirelessly attached to the device and are to receive the CDRX parameters.

8. The device of claim 1, wherein when the processor sends the CDRX timing parameters, the processor is configured to:
send the CDRX timing parameters via one or more Radio Resource Control (RRC) messages to the UE.

9. A method comprising:
receiving parameters that are associated with a User Equipment device (UE);
selecting, based on the parameters, a connected-mode discontinuous reception (CDRX) timing parameters that include an On-Duration and a long CDRX cycle period;
determining a traffic load at a device; and
when the traffic load at the device is greater than a threshold, sending the CDRX timing parameters to the UE,
wherein the On-Duration is longer than a duration of signals from the device to UEs that are to share the CDRX timing parameters; and
wherein the long CDRX cycle period is equal to an average of periods of the signals from the device to the UEs that are to share the CDRX timing parameters.

10. The method of claim 9, therein the parameters comprise at least one of:
a UE group identifier (ID);
a Quality-of-Service (QOS) ID;
a radio access technology (RAT) type;
a frequency band; or
an ID of a network slice to which the UE is connected.

11. The method of claim 9, wherein determining the traffic load comprises determining the traffic load based on one or more of:
a physical resource block (PRB) utilization rate;
a transmission time interval (TTI) utilization rate;
a cell throughput; or
a user perceived throughput (UPTP).

12. The method of claim 9, wherein the CDRX timing parameters further include at least one of:
an inactivity time interval; or
a CDRX-Start offset time.

13. The method of claim 12, wherein:
the On-Duration that is less than an On-Duration of a current CDRX cycle of the UE;
the inactivity time interval is less than an inactivity interval of the current CDRX cycle of the UE; and
the long CDRX cycle period is greater than a long cycle CDRX cycle period of the current CDRX cycle of the UE.

14. The method of claim 9, further comprising:
transmitting physical downlink control channel (PDCCH) signals to the UE, and
wherein the CDRX timing parameters specify timing, at the UE, of CDRX cycles synchronized to the PDCCH signals.

15. The method of claim 14, further comprising:
determining the CDRX timing parameters based on timing of broadcast signals to UEs that are wirelessly attached to the device and are to receive the CDRX parameters.

16. The method of claim 9, wherein sending the CDRX timing parameters to the UE comprises:
sending the CDRX timing parameters via one or more Radio Resource Control (RRC) messages to the UE.

17. A non-transitory computer-readable medium comprising processor-executable instructions, which, when executed by a processor in a device, cause the processor to:
receive parameters that are associated with a User Equipment device (UE);
select, based on the parameters, a connected-mode discontinuous reception (CDRX) timing parameters that include an On-Duration and a long CDRX cycle period;
determine a traffic load at the device; and when the traffic load at the device is greater than a threshold, send the CDRX timing parameters to the UE, wherein the On-Duration is longer than a duration of signals from the device to UEs that are to share the CDRX timing parameters; and wherein the long CDRX cycle period is equal to an average of periods of the signals from the device to the UEs that are to share the CDRX timing parameters.

18. The non-transitory computer-readable medium of claim 17, therein the parameters comprise at least one of:

a UE group identifier (ID);

a Quality-of-Service (QOS) ID;

a radio access technology (RAT) type;

a frequency band; or an ID of a network slice to which the UE is connected.

19. The non-transitory computer-readable medium of claim 17, wherein when the processor determines the traffic load, the processor is configured to determine the traffic load based on one or more of:

a physical resource block (PRB) utilization rate;

a transmission time interval (TTI) utilization rate;

a cell throughput; or a user perceived throughput (UPTP).

20. The non-transitory computer-readable medium of claim 17, wherein the CDRX timing parameters further include at least one of:

an inactivity time interval; or a CDRX-Start offset time.

* * * * *